United States Patent Office 3,425,849
Patented Feb. 4, 1969

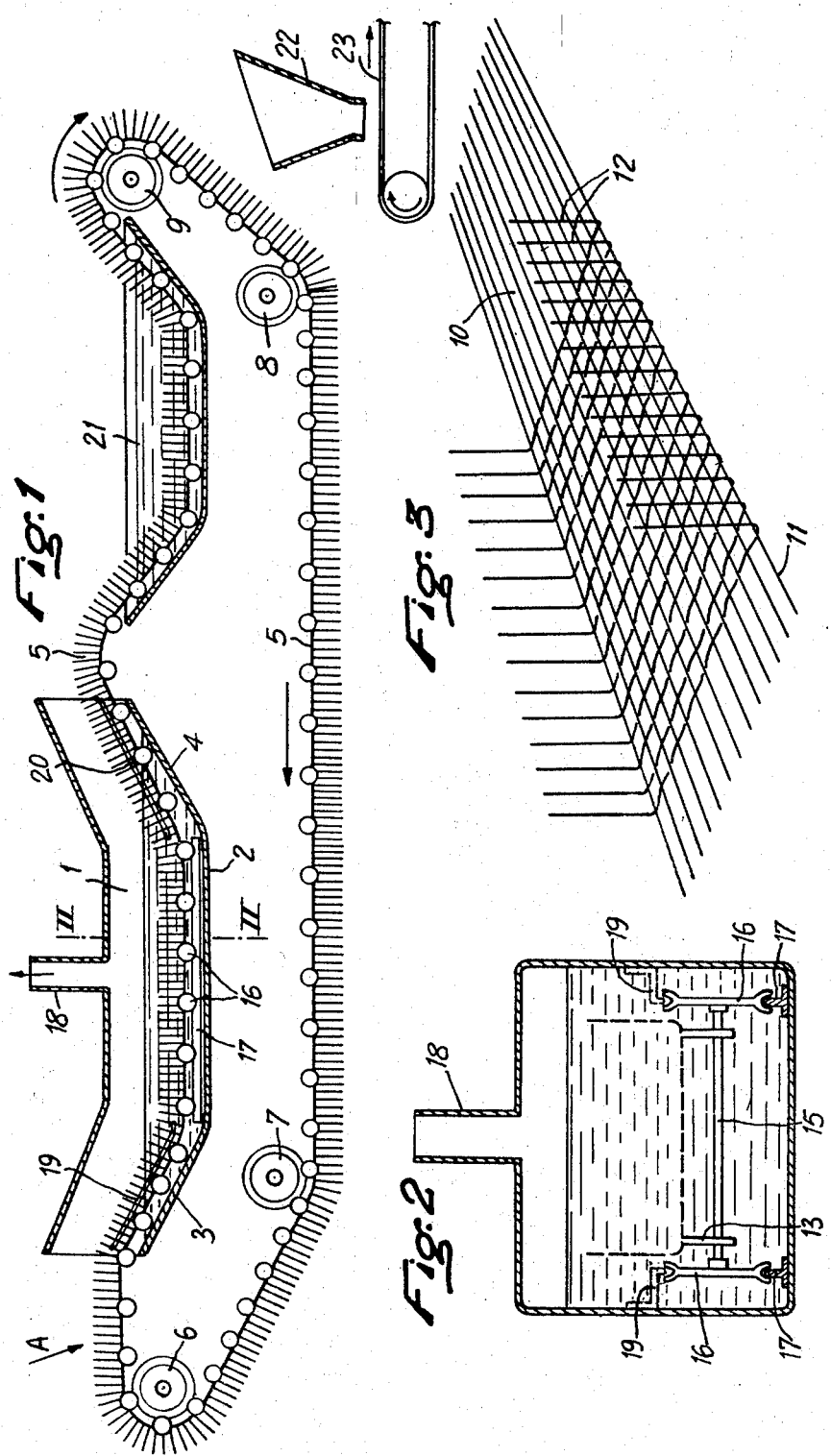

3,425,849
DEHYDRATION OF POTATOES
Henri Griffon, 2 Place Mazas, Paris, France
Filed July 29, 1963, Ser. No. 298,350
Claims priority, application France, July 30, 1962,
905,494; Jan. 28, 1963, 922,814
U.S. Cl. 99—207　　　　　　　　　　　　　11 Claims
Int. Cl. A23l 1/12

ABSTRACT OF THE DISCLOSURE

Dehydration of potatoes in which potatoes are cut into a stream of uniform pieces while in water, then cooked in boiling water, immediately cooled in water, mixed with liquid into a puree and then dehydrated preferably while below 37° C.

---

The present invention relates to an improvement in dehydration processes which are applicable to numerous animal or vegetable substances and particularly to potatoes or other starchy vegetables, consisting in carrying out the cooking thereof beforehand in continuous manner, this cooking being followed by a rapid cooling before reduction to pulp, which will itself be followed by by subsequent dehydrating operations.

It will be possible with advantage for this dehydration to be carried out under conditions such that the temperature of the treated material does not exceed 37° C., and under the conditions described in my previous patent application Ser. No. 261,484, filed Feb. 27, 1963 and now abandoned.

The fundamental advantage of the continuous cooking method, considered from the view of a process for dehydrating potatoes or the like, is to avoid the preparation of a large quantity of potatoes at the same time, which would render necessary the use of reducing agents such as sulphur dioxide in order to avoid the blackening of the tubers and which would cause a partial hydrolysis of the starch, frequently accompanied by fermentation phenomena due to the slow cooling of a mass of substance having low heat conductivity.

Furthermore, this elimination of any possibility of blackening or fermentation also results from the fact that the material is broken up into relatively small pieces and under water, this ensuring at the same time the washing of the treated materials.

On the other hand, the continuous preparation permits the rapid cooling of the tubers between the cooking phase and the pulping phase, this cooling having been recognised by experience as being favourable to obtaining a consistency and a good flavour of the preparation, after reconstitution by adding water or milk, or the mixture of these two liquids, extremely similar to that of a pulp prepared according to the usual methods of domestic cuisine.

After the cooling operation, there is preferably added a quantity of water corresponding to about a third to half of the weight of the cooled tubers and it is advantageous to beat the pulp in order to obtain by emulsion a product of creamy appearance which will then be subjected to dehydration.

This preparation, combined with the use of dehydration at low temperature, makes it possible to avoid the phenomena of rancidness and hydrolysis and to obtain a potato powder of particularly good quality.

A second object of the invention is a continuous cooking apparatus enabling the said process to be carried into effect, it being moreover noted that this apparatus can be used in many cases other than that of the first phase of such a dehydration process, and particularly for the preparation of pulps or purees of all types or even foods boiled in water.

This apparatus in characterised in that it comprises a boiler of tunnel form, the inlet and the outlet of which are raised relatively to the middle section by an amount sufficient to maintain a good level of water, this tunnel-type boiler being traversed by a flexible endless conveyor serving as carrier for the potatoes or the like, the speed of said conveyor being regulated so that the period of immersion in the water of the boiler corresponds to that necessary for the cooking operation.

The tunnel-type boiler is preferably equipped in its central section with an exhaust conduit for the steam which is liberated, so as to prevent this steam entering the room in which the apparatus is located.

The flexible conveyor advantageoulsy comprises a perforated bottom and extensible lateral walls, the upper side being free; it may be made of any appropriate material, for example of a plastic material which is resistant to the maximum temperature provided or of metal. In one simple embodiment, it is formed by a bottom comprising a metal grid or lattice, of which the transverse wires are bent up perpendicularly to the bottom in order to form the sides.

When the apparatus is designed for certain applications, such as the preparation of a pulp or puree adapted to be subjected to a dehydration process, the tunnel boiler is followed by a cooling tank through which the conveyor also extends, the said conveyor then discharging the cooked and cooled tubers into a pulping press which converts the tubers into a pulp or puree which is then transported to the dehydration section.

By way of example and in order to facilitate understanding of the present specification, reference is made to the accompanying drawing, wherein:

FIGURE 1 is a diagrammatic longitudinal section of an apparatus according to the invention;

FIGURE 2 is the corresponding view in vertical section and to a larger scale, on the line II—II of FIGURE 1;

FIGURE 3 is a perspective view of one embodiment of an endless conveyor.

In this example, which relates to a cooking apparatus for the purpose of preparing a pulp or puree which will then be dehydrated, the tunnel-type boiler 1 comprises a central section 2 with a substantially flat base and two sloping sections, the section 3 serving for the introduction and the section 4 for the discharge. The heating is assured by any appropriate means (not shown), which may be an external flame, a coil or a double bottom traversed by steam or even electric resistances equipping the central section 2.

Extending through the boiler is a conveyor 5 which is equipped with bearing rollers which run over circular guide members or the like, such as 6, 7, 8, 9.

The conveyor is constituted by a grid 10 which is preferably formed of stainless steel, having metal warp wires 11 and transverse weft wires 12, for example, of $d=2$ mm. In order to form the sides, a certain number of warp wires is omitted from each side of the grid-like conveyor so as to leave free the weft wires over a length corresponding to the side which is to be obtained; these ends are bent up in such a way that they are perpendicular to the bottom, as indicated at 12. There are thus obtained extensible sides which do not cause any obstacle to the deformations to which the conveyor is subjected in the flexing movements during its travel and particularly on passing over the guide rollers 6, 7, 8, 9.

In the tunnel-type boiler, the conveyor which carries the rollers 16 mounted on the axle 15 is guided by rails 17.

It is also possible to provide upper guide rails 19, 20, in order to avoid inopportune lifting movements of the conveyor under the effect of the traction due to the driving thereof.

Provided in the top of the central section is an exhaust conduit 18 for the steam which is generated, in order to prevent this steam escaping through the ends of the tunnel into the workroom.

Following the tunnel-type boiler is a cooling tank 21 which may be open and which can comprise guide means for the conveyor similar to those described in connection with the boiler.

On leaving the tank 21, the conveyor passes over a guiding and driving roller 9 and disposed vertically beneath this roller is an apparatus such as a continuous pulping press 22, in which the cooked and cooled tubers can fall freely because the conveyor is not closed on its upper side. The puree or pulp which is obtained is then conducted if required by a conveyor 23 to the dehydration section (not shown in the drawing).

Using a similar machine, the application of the process forming the subject of the invention will be carried out as follows:

The potatoes, which are washed and scrubbed and preferably peeled mechanically or by steam by the conventional methods, are cut into relatively small pieces which are as far as possible similar to one another; in particular, good results have been obtained by cutting them into small cubes or dices having a side of about 1 to 2 cm. Under these conditions, on the one hand the boiling water penetrates satisfactorily between all the pieces and on the other hand the continuous movements are carried out regularly and without any congestion and finally the cooling following the cooking is sufficiently rapid.

This operation is carried out in any conventional cutter device which consequently has not been illustrated, and it is operated in water so that the tubers, during this phase, are protected from any oxidation and are washed, this extracting the starch and freeing them from any skin debris, earth, etc.

As the potatoes are cut up, they are placed at A on the conveyor 5. They travel through the water, brought to boiling point, in the tunnel-type boiler 1 at a speed calculated so that each piece of potato is kept in the water for a period of time necessary for the cooking thereof, i.e. from 12 to 15 minutes, according to types. At the outlet end, the conveyor with its load of potatoes enters the cold water tank 21, and then it tips the potatoes into the continuously running pulping press 22.

In order to obtain a pulp of a suitable consistency, a certain quantity of water is added, this quantity being approximately between a third and a half of the weight of the cooled tubers.

This addition can be made in the pulping press, or in a mixer at the outlet from the latter, or partly in one apparatus and partly in the other apparatus.

The pulp with a suitable consistency is beaten so as to provide an emulsion by occlusion of air in order to obtain a creamy product. It has been established that this formation of an emulsion is favourable to the subsequent operation of dehydration.

This beating can be carried out with any suitable apparatus, for example of mechanical type; this operation can be combined in a simple apparatus with all or part of the addition of water provided above.

Finally, it must be pointed out that the addition of water as provided above can be combined with an addition of milk, the total quantity of water thus incorporated being kept substantially in the same proportions.

The creamy pulp thus obtained is then dehydrated in any appropriate apparatus and preferably by the apparatus forming the subject of my co-pending patent application Ser. No. 298,074, filed July 29, 1963, and now Patent No. 3,266,558.

Under these conditions, after dehydration, a solid product is obtained in the form or flakes or powder, this permitting the user to obtain by simple addition of the necessary quantity of water a milky pulp equivalent to the traditional pulp.

This product is collected and then if desired it is ground and screened (preferably a number 60 screen). There is thus obtained a dry pulverous substance, the content of which is about 10% to 15% of the dry material. It has been found that good results are even obtained if the dehydration is only carried out as far as this latter value, and that the products obtained with this water content are preserved satisfactorily under these conditions.

This powder, to which water or milk or the mixture of these two liquids is added, is reconstituted after appropriate heating according to the respective proportions either as mashed potato boiled in water, or as traditional potato puree. Using the powder to which water and milk are suitably added, it is possible to make all the culinary preparations which have as their base potatoes on the form of a puree, such as souffle, fritters, pancakes, croquettes, potato soups, etc.

Furthermore, it has been found by the inventor that the present process is applicable not only to vegetable substances similar to potatoes, but to all types of foodstuffs requiring cooking followed by cooling, and even animal substances; thus, the present process can be used for the preparation of powders consisting of chicken meat, fish or other animals. In the case of chicken, for example, the animal is treated by boiling followed by cooling in the apparatus described in the present patent application; the meat then has very little adherence to the bones so that it can be detached easily and completely therefrom; it is then subjected to the processes previously described for the preparation of a homogeneous paste by grinding with water and dessication.

I claim:

1. Process for the dehydration of potatoes which comprises the steps of
   (a) cutting peeled potatoes into fragments of substantially uniform small size while the potatoes are in water; then, without prior chemical treatment;
   (b) maintaining fragments in boiling water only until cooked;
   (c) immediately thereafter rapidly cooling the cooked fragments by immersing them in cold water;
   (d) immediately thereafter removing the cooled potatoes from the water and reducing the cooled, cooked fragments to a pulp or puree; and
   (e) thereafter dehydrating the pulp or puree.

2. Process according to claim 1, in which the potatoes are cut into pieces having sides of 1 to 2 cm.

3. Process according to claim 1, in which the potatoes, on leaving the cooking apparatus, have added thereto one third to one half of their weight of water in order to be reduced to a puree and beaten so as to obtain a creamy product.

4. Process according to claim 3, in which the puree is made with incorporation of milk.

5. Process according to claim 4, in which the dehydration is carried out by drying at low temperature in a thin continuous layer.

6. A process for the dehydration of potatoes which comprises the successive steps, prior to dehydration, of
   (a) cutting peeled potatoes into pieces of substantially uniform size while the potatoes are in water; then, without prior chemical treatment;
   (b) removing the cut pieces of potato from the water and immediately thereafter passing the cut pieces of potato as a continuous stream through a reservoir of boiling water for a period of time just sufficient to cook the potato;
   (c) immediately thereafter removing the continuous stream of cooked potato pieces from the reservoir of boiling water;

(d) immediately thereafter rapidly cooling the continuous stream of hot cooked pieces of potato by passing the continuous stream of cooked pieces of potato through a reservoir of cold water for a period of time sufficient to cool the potato;

(e) immediately thereafter removing the continuous stream of cooled, cooked pieces of potato from the reservoir of cold water; and (f) immediately thereafter converting the stream of cooled cooked pieces of potato into a pulp siutable for dehydration.

7. The process of claim 6 wherein in step (a) the potatoes are cut into uniform pieces of from 1 to 2 cm. in each side.

8. The process of claim 6 wherein in step (b) the potato pieces are cooked between 12 and 15 minutes.

9. The process of claim 6 wherein the pulp is dehydrated as a homogeneous mixture with from one third to one half of its weight of water, milk or both.

10. The process of claim 9 wherein the homogeneous mixture is dehydrated under conditions such that the temperature of the mixture does not exceed 37° C.

11. A process for the production of dehydrated potato which comprises the steps of (a) cutting peeled potatoes into pieces of a substantially uniform size of from 1 to 2 cm. while the potatoes are in water; then, without prior chemical treatment;

(b) removing the cut pieces of potato from the water and immediately thereafter transferring a continuous stream of the cut potatoes into a reservoir of boiling water;

(c) passing the cut pieces of potato as a continuous stream through the boiling water for from 12 to 15 minutes until cooked;

(d) rapidly cooling the cooked potato pieces by immediately thereafter transferring the continuous stream of cooked potato pieces to a reservoir of cold water;

(e) passing the cooked potato pieces as a continuous stream through the reservoir of cold water;

(f) removing the continuous stream of cooled cooked potato pieces from the cooling water;

(g) immediately thereafter reducing the cooled, cooked potato pieces to a pulp or puree; and (h) dehydrating a homogeneous mixture of the potato pulp and from one third to one half of its weight of water, milk or both, under conditions such that the temperature of the mixture does not exceed 37° C.

References Cited

Talburt, W. F., Potato Processing Avi Publishing Company Inc., Westport, Conn., 1959 SB 211 P sT3 C.Z. (pp. 207 and 357).

Claffey et al., "Estimated Cost and Equipment for Commercial Production of Potato Flakelets," ARS 73–36, October 1961, Agricultural Research Service U.S.D.A. pp. 4 and 5 (99–207).

A. LOUIS MONACELL, *Primary Examiner.*

D. M. NAFF, *Assistant Examiner.*